United States Patent
Groendahl et al.

(10) Patent No.: US 7,836,575 B2
(45) Date of Patent: Nov. 23, 2010

(54) METHOD FOR PERMANENT MAGNET PROTECTION

(75) Inventors: Erik Groendahl, Them (DK); Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 236 days.

(21) Appl. No.: 12/151,615

(22) Filed: May 8, 2008

(65) Prior Publication Data

US 2008/0276449 A1 Nov. 13, 2008

(30) Foreign Application Priority Data

May 9, 2007 (EP) .................................. 07009348

(51) Int. Cl.
*H02K 15/02* (2006.01)
(52) U.S. Cl. ...................... 29/596; 29/736; 310/156.12; 264/272.15
(58) Field of Classification Search ................ 29/592.1, 29/602.1, 596–598; 336/200, 232; 264/255, 264/271.1, 272.15, 272.19; 310/156.12, 310/156.22
See application file for complete search history.

(56) References Cited

U.S. PATENT DOCUMENTS

| | | | | |
|---|---|---|---|---|
| 4,173,822 A | * | 11/1979 | Futterer et al. ................. | 29/596 |
| 4,327,479 A | * | 5/1982 | Futterer et al. ................. | 29/596 |
| 4,573,258 A | * | 3/1986 | Io et al. ......................... | 29/596 |
| 4,741,094 A | * | 5/1988 | Denk et al. .................... | 29/598 |
| 5,226,220 A | * | 7/1993 | Gevas et al. ................... | 29/605 |
| 5,831,364 A | | 11/1998 | Buse | |
| 6,331,214 B1 | | 12/2001 | Koga et al. | |
| 6,380,833 B1 | | 4/2002 | Nguyen et al. | |
| 6,548,925 B2 | * | 4/2003 | Noble et al. ................... | 310/74 |
| 6,692,676 B1 | * | 2/2004 | Dwyer et al. .................. | 264/255 |
| 2005/0116392 A1 | | 6/2005 | Hughes et al. | |
| 2008/0276449 A1 | * | 11/2008 | Groendahl et al. ............ | 29/607 |

FOREIGN PATENT DOCUMENTS

| | | |
|---|---|---|
| EP | 0899049 A1 | 3/1999 |
| EP | 1420501 A2 | 5/2004 |
| GB | 2323217 A | 9/1998 |
| JP | 2000014062 A | 1/2000 |
| WO | WO 0060617 A1 | 10/2000 |

* cited by examiner

*Primary Examiner*—Minh Trinh

(57) ABSTRACT

A method for manufacturing of a permanent magnet pole piece comprising at least one magnet which is fixed to a base plate, a protective cover and a filling mass is provided, comprising the steps of fixing of the protective cover to the base plate so that it covers the magnet and so that the protective cover and the base plate are hermetically sealed jointed, evacuating of the interior cavity between the protective cover and the base plate through an opening, injecting of the filling mass through an opening into the interior cavity between the protective cover and the base plate and curing of the filling mass.

17 Claims, 1 Drawing Sheet

METHOD FOR PERMANENT MAGNET PROTECTION

CROSS REFERENCE TO RELATED APPLICATIONS

This application claims the benefits of European application No. 07009348.9 filed May 9, 2007 and is incorporated by reference herein in its entirety.

FIELD OF INVENTION

The present invention relates to a method for magnet protection in large permanent magnet machines.

BACKGROUND OF THE INVENTION

Strong permanent magnets, like rare-earth magnets, are used to an increasing extent in large electrical machines, especially in motors and generators. This is due to the increased efficiency and robustness compared to electrical excitation. But regarding practical applications some difficulties occur. The magnet materials corrode very easily and need a high degree of protection. The materials, in particular of rare-earth magnets, are also rather brittle and cannot safely be fixed by bolting alone.

In WO 00/60617 an encapsulated magnet assembly is disclosed, which comprises a non-metallic housing and a magnet disposed within a housing magnet chamber. A housing end cap is fuse bonded to the housing to encapsulate the magnet therein and form an air and fluid-tight seal with the housing. An insulating spacer is interposed between an exposed surface of the magnet and the end cap before assembly and fuse bonding, and is formed from a thermally insulating material to prevent the transmission of thermal energy to the magnet during the fuse bonding process. The housing also includes one or more projections that extend into the magnet chamber and that cooperate with complementary grooves in the magnet to prevent the magnet from rotating in within the chamber.

In US 2005/0116392 A1 a magnet is described which is encapsulated within a canister formed from two cans into a laminated structure. Each can an end wall and a cylindrical side wall. One can additionally includes an annular lip that slidably fits outside the sidewall of the other can with a small gap therebetween. The magnet is inserted into the two cans together with a flowable and curable adhesive. The adhesive is cured to bond the cans together and to also hermetically seal the structure.

In EP 1 420 501 A2 a rotor which comprises magnets and a method of mounting magnets in such rotor is disclosed. The magnets are embedded in the rotor while maintaining the mounting position in a way quite similar to the mounting position of surface-mounted magnets.

The traditional method of mounting permanent magnets on, for instance, a large generator rotor comprises the following steps. First, the extensive surface of the individual magnets needs to be protected. Secondly, the magnets are fixed to a rotor rim by, for instance, gluing. In a last step, the completed rotor with the magnets glued to it has to be wrapped with a fibreglass bandage.

This method has several uncertainties. The surface protection is expensive and due to new technologies it is not proven over a lifetime of e.g. twenty years. Furthermore, the magnets cannot be magnetised in situ. This means that all work is done with magnetised parts. This requires special tools and stringent work controls to avoid hazardous situations. Once mounted on the rotor and covered by the fibreglass bandage the magnets cannot be removed for a magnetisation in case of an irreversible demagnetisation event.

In order to overcome these difficulties, solutions have been developed whereby magnets are manufactured as complete pole pieces. The permanent magnet pole pieces can be used for electrical machines, for example. In a pole piece one or more magnets are fixed by gluing to a steel base plate and are covered with a protective cover. The protective cover can, for instance, be made of stainless steel. The inside of the protective cover is filled with a filling mass to ensure that the magnets will not move inside the protective cover if the glue joint to the base plate gives way. The filling mass may be, for instance, epoxy resin or silicone rubber. Provided that the cover does not allow diffusion of water vapour and the filling mass completely surrounds the magnet, a high degree corrosion protection of the magnet is not required.

This method more or less eliminates the drawbacks of traditional magnet mounting. Expensive surface protection is not required. Further, the magnets can be magnetised after mounting in the pole piece and the magnets can be removed for magnetisation in case of an irreversible demagnetisation event.

A remaining practical difficulty is the attachment of the protective cover to the base plate. Preferably, the protective cover should be welded or soldered to the base plate in order to create an airtight seal that will further reduce the risk of corrosion. However, it is very difficult to avoid contamination of the welding or soldering point by the material of the filling mass and this can compromise the quality of the joint. Furthermore, the heat input from the welding or soldering process can degrade the filling mass and thereby reduce its corrosion protection capacity. Consequently, bolted joints are sometimes used but this obviously does not provide an airtight joint between the protective cover and the base plate.

SUMMARY OF INVENTION

It is therefore an objective of the present invention to provide an improved method for magnet protection.

This objective is solved by a method for manufacturing a permanent magnet pole piece as claimed in the claims. The depending claims define further developments of the invention.

The permanent magnet pole piece, which is manufactured by the inventive method, comprises at least one magnet, a base plate, a protective cover and a filling mass. The one or more magnets are attached to the base plate, for instance by gluing. The inventive method is characterised by the following steps. First the protective cover is fixed to the base plate so that it covers the magnet. Furthermore, the protective cover is fixed to the base plate so that the protective cover and the base plate are hermetically sealed. Now the interior cavity between the protective cover and the base plate is evacuated through an opening. Then the filling mass is injected into the interior cavity between the protective cover and the base plate through an opening. In a last step, the filling mass is cured.

The evacuation of the interior cavity between the base plate and the protective cover subsequent to the joining of the protective cover to the base plate has the following advantages. The inventive method maintains the benefits of pole pieces compared with bandaged solutions but eliminates the drawbacks of known methods for the manufacturing of pole pieces. The magnets will enjoy superior corrosion and mechanical protection inside a hermetically sealed protective cover filled with a suitable filling mass. The joint between the protective cover and the base plate is not compromised by a contamination with filling mass. Further, the filling mass is not degraded by heat input from welding or soldering as, in contrary to the state of the art, the filling follows the fixing of the protective cover.

The protective cover can be fixed to the base plate, for instance by gluing, welding or soldering. The interior cavity between the protective cover and the base plate may be evacuated through at least one opening in the base plate or in the protective cover. Preferably two openings both located in the base plate are used, one opening to evacuate the interior cavity and the other opening to inject the filling mass.

It is also possible to use the same opening for evacuating the interior cavity and for injecting the filling mass. This opening can be located in the base plate or in the protective cover. Of course, the evacuation of the interior cavity as well as the injection of the filling mass can each be done through more than one opening which is located in the base plate or in the protective cover. The evacuation can be achieved by use of a suction device which may be a pump, preferably a vacuum pump.

In the context of the present invention evacuating means generating vacuum inside the interior cavity, for example rough, medium, low or high vacuum. Moreover, evacuating means sucking air out of the interior cavity while sucking the filling mass into the interior cavity.

Generally, the base plate and the protective cover can be made of steel or stainless steel. Epoxy resin, silicone rubber or any other suitable mass can be used as filling mass.

During the injecting process the filling mass may flow into the interior cavity by the action of ambient air pressure. In addition, an overpressure can be applied to ensure filling of the whole interior cavity between the protective cover and the base plate.

Before fixing the protective cover to the base plate a thin fibreglass mat can be placed on the surface of the magnet. This thin fibreglass mat may be placed on a part of the surface or on the entire surface of the magnet and provides an improved filling mass flow pathway.

Moreover, the protective cover may comprise one or more fibreglass mats. The protective cover can be glued to the base plate by the injected filling mass. Especially the typically metallic protective cover may be replaced by one or more fibreglass mats that are injected with the filling mass and the welding or soldering joint to the base plate can be replaced by gluing as a result of the filling mass injection.

It is advantageous to use more than one opening at the periphery of the base plate or the protective cover to suck the filling mass into the interior cavity through one or more other openings. This ensures a uniform filling of the interior cavity with filling mass.

The opening or the openings used for the evacuation and the injection may be closed by the filling mass, by a valve or by any other suitable means. The closing can be done after the injection of the filling mass or after the curing of the filling mass.

It is further possible to use demagnetised magnets. In this case, the demagnetised magnet can be magnetised after the curing of the filling mass. For instance, rare-earth magnets demagnetise at a temperature of ca. 80° C. This means that the welding or soldering process may demagnetise such a rare-earth magnet.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
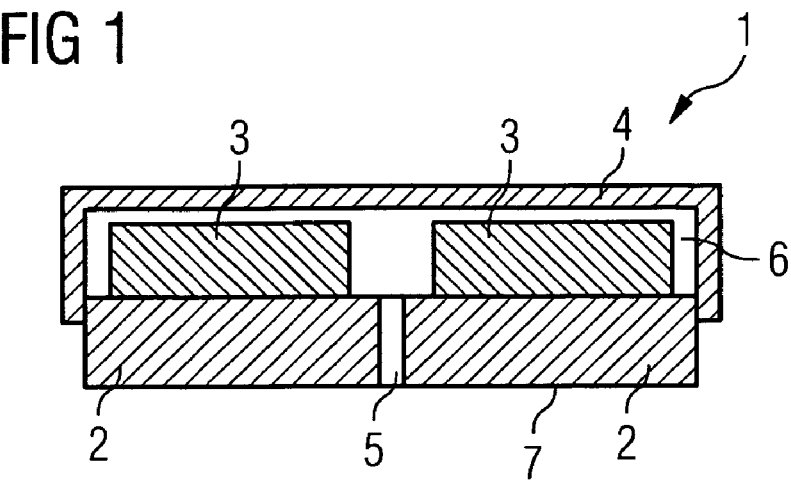
FIG. 1 schematically shows a pole piece in a sectional view.

Now a first embodiment of the present invention will be described with reference to FIGS. 1 and 2. FIG. 1 schematically shows a pole piece 1 in a sectional view. One can see in FIG. 1 a base plate 2 with an opening 5, two magnets 3 and a protective cover 4. The base plate 2 and the protective cover 4 may be made of steel or stainless steel.

The magnets 3 are fixed to the base plate 2, for instance by glue. The base plate 2 has an opening 5 which is located between the magnets 3. The magnets 3 are covered by the protective cover 4 which is connected to the base plate 2. In the present embodiment, the protective cover 4 is soldered to the base plate 2. However, the protective cover 4 can also be fixed to the base plate 2 by other suitable means, for instance by gluing or welding. The joint between the protective cover 4 and the base plate 2 is hermetically sealed.

The magnets 3 and the protective cover 4 are not directly in contact. The protective cover 4 is connected to the base plate 2 so as to form an interior cavity 6 between the protective cover 4 and the base plate 2. This interior cavity 6 is in flow connection with two openings 5 which are situated between the two magnets in the base plate 2. In FIG. 1 only one of the two openings is visible.

Figure 2:
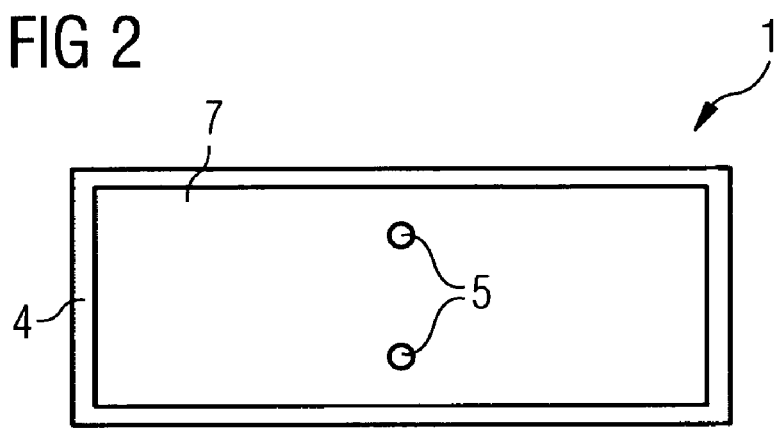
FIG. 2 schematically shows a pole piece in a bottom view.

Both openings are shown in FIG. 2, which schematically shows the pole piece 1, as it is shown in FIG. 1, in a bottom view. One can see in FIG. 2 the bottom side 7 of the base plate 2. The base plate has two openings 5 which are both connected to the interior cavity 6, as shown in FIG. 1. Further, one can see in FIG. 2 the protective cover 4 which surrounds the base plate 2.

After the fixation of the magnets 3 to the base plate 2, e.g. by gluing, the protective cover 4 is, for example, soldered to the base plate 2. Then one of the openings 5 is connected to a vacuum pump via a valve and the other opening 5 is connected to a silicone rubber reservoir via a valve. Alternatively to silicone rubber also epoxy resin can be used.

First the valve to the silicone rubber reservoir is closed and the valve to the vacuum pump is open. The interior cavity 6 is now evacuated by the vacuum pump. After this the valve to the vacuum pump is closed and the valve to the silicone rubber reservoir is opened. Due to the vacuum in the interior cavity 6 the silicone rubber is sucked into the interior cavity 6. Then both openings 5 can be opened until the silicone rubber is cured. After curing of the silicone rubber the openings 5 may be left open if the filling mass is able to close these openings when it is cured. Alternatively, the openings 5 may be closed again, for instance by a cap.

Now a second embodiment of the present invention will be described with reference to FIG. 3. Elements corresponding to elements of the first embodiment will be designated with the same reference numerals and will not be described again.

Figure 3:
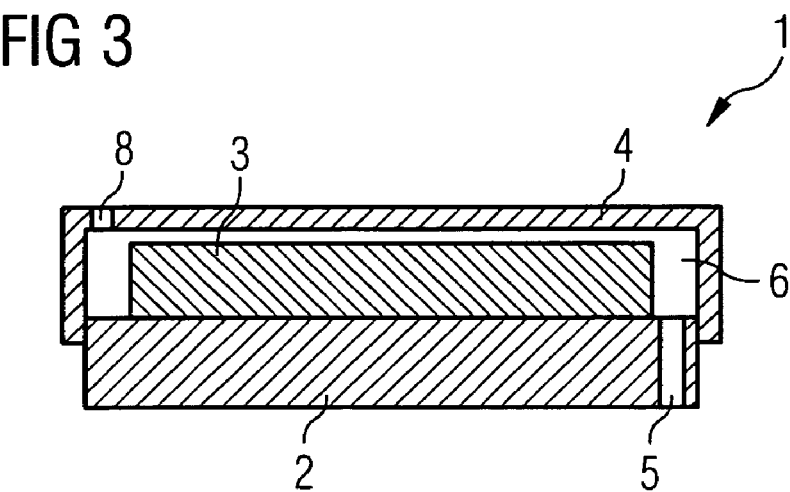
FIG. 3 schematically shows a pole piece in a sectional view.

In FIG. 3 a pole piece 1 is schematically shown in a sectional view. The pole piece 1 comprises a base plate 2, a magnet 3 and a protective cover 4. The magnet 3 is glued to the base plate 2. The protective cover 4 covers the magnet 3 without touching the magnet 3 and is fixed to the base plate 2 by welding. The joint between the protective cover and the base plate provides a hermetical seal. Between the magnet and the protective cover an interior cavity 6 is formed.

The base plate 2 comprises an opening 5 which is connected to the interior cavity 6 besides the magnet 3. Further, the protective cover 4 also comprises an opening 8 which is located as far as possible from the opening 5 in the base plate 2. Preferably, the opening 5 in the base plate 2 is located at one side of the magnet 3 and the opening 8 in the protective cover 4 is located at the opposite side of the magnet 3.

To manufacture the pole piece 1 first the demagnetised magnet 3 is fixed to the base plate 2 by gluing. The base plate may be made of steel or stainless steel. Then the protective cover 4 is fixed to the base plate 2 by gluing, soldering or, like in the present embodiment, by welding so as to provide a hermetically sealed joint between the protective cover 4 and the base plate 2. Further, the protective cover 4 is connected to the base plate 2 so as to leave a space or an interior cavity 6 between the magnet 3 and the protective cover 4.

The opening 8 in the protective cover 4 is connected to a vacuum pump and the opening 5 in the base plate 2 is connected to a filling mass injection device, for example a epoxy resin or silicone rubber reservoir. The interior cavity 6 between the protective cover 4 and the base plate 2 is now evacuated using the vacuum pump through the opening 8 in the protective cover 4. Meanwhile the injection mass, which may be epoxy resin or silicone rubber, is sucked into the interior cavity 6 through the opening 5 in the base plate 2.

When the interior cavity 6 is completely filled with the filling mass the openings 5 and 8 can be closed, for example by a cap. The openings 5 and 8 may alternatively be left open if the filling mass is able to close them after curing. Now the filling mass is cured. After curing of the filling mass the magnet 3 can be magnetised.

The invention claimed is:

1. A method for manufacturing of a permanent magnet pole piece including a magnet fixed to a base plate, a protective cover and a filling mass, comprising:
    fixing of the protective cover to the base plate so that the protective cover covers the magnet such that an interior cavity between the protective cover and the base plate are framed and such that the protective cover and the base plate are hermetically sealed;
    evacuating the interior cavity through a first opening;
    injecting the filling mass through a second opening into the interior cavity; and
    curing the filling mass,
    wherein the evacuating generates a vacuum inside the interior cavity causing the filling mass to be sucked into the interior cavity.

2. The method as claimed in claim 1, wherein the protective cover is fixed to the base plate by gluing, welding or soldering.

3. The method as claimed in claim 1, wherein the first opening that the interior cavity is evacuated is arranged in the base plate.

4. The method as claimed in claim 1, wherein the second opening that the filling mass is injected is arranged in the base plate.

5. The method as claimed in claim 1, wherein a fibreglass mat is placed on at least a part of a surface of the magnet before fixing the protective cover to the base plate.

6. The method as claimed in claim 1, wherein the protective cover comprises a fibreglass mat.

7. The method as claimed in claim 1, wherein the magnet is demagnetized.

8. The method as claimed in claim 7, wherein the demagnetized magnet is magnetised after the filling mass is cured.

9. The method as claimed in claim 1, wherein the base plate is made of steel.

10. The method as claimed in claim 1, wherein the protective cover is made of steel or stainless steel.

11. The method as claimed in claim 1, wherein the filling mass is epoxy resin or silicone rubber.

12. The method as claimed in claim 1, wherein the protective cover is glued to the base plate.

13. The method as claimed in claim 1, wherein the protective cover is welded to the base plate.

14. The method as claimed in claim 1, wherein the protective cover is soldered to the base plate.

15. The method as claimed in claim 1, wherein the first opening that the interior cavity is evacuated is arranged in the base plate or in the protective cover.

16. The method as claimed in claim 1, wherein the second opening that the filling mass is injected is arranged in the base plate or in the protective cover.

17. A method for manufacturing of a permanent magnet pole piece having a magnet fixed to a base plate, a protective cover and a filling mass, comprising:
    fixing of the protective cover to the base plate so that the protective cover covers the magnet and forming an interior cavity between the protective cover and the base plate so that the protective cover and the base plate are hermetically sealed;
    evacuating the interior cavity through an opening;
    injecting the filling mass through an opening into the interior cavity; and
    curing the filling mass;
    wherein the protective cover is fixed to the base plate by gluing, welding or soldering;
    wherein the opening that the interior cavity is evacuated is arranged in the base plate or in the protective cover;
    wherein the opening that the filling mass is injected is arranged in the base plate or in the protective cover;
    wherein a fibreglass mat is placed on at least a part of a surface of the magnet before fixing the protective cover to the base plate;
    wherein the protective cover comprises a fibreglass mat;
    wherein the protective cover is glued to the base plate by the injected filling mass.

* * * * *